(No Model.)
A. F. DELLONE.
FEED HOPPER.
No. 463,493. Patented Nov. 17, 1891.
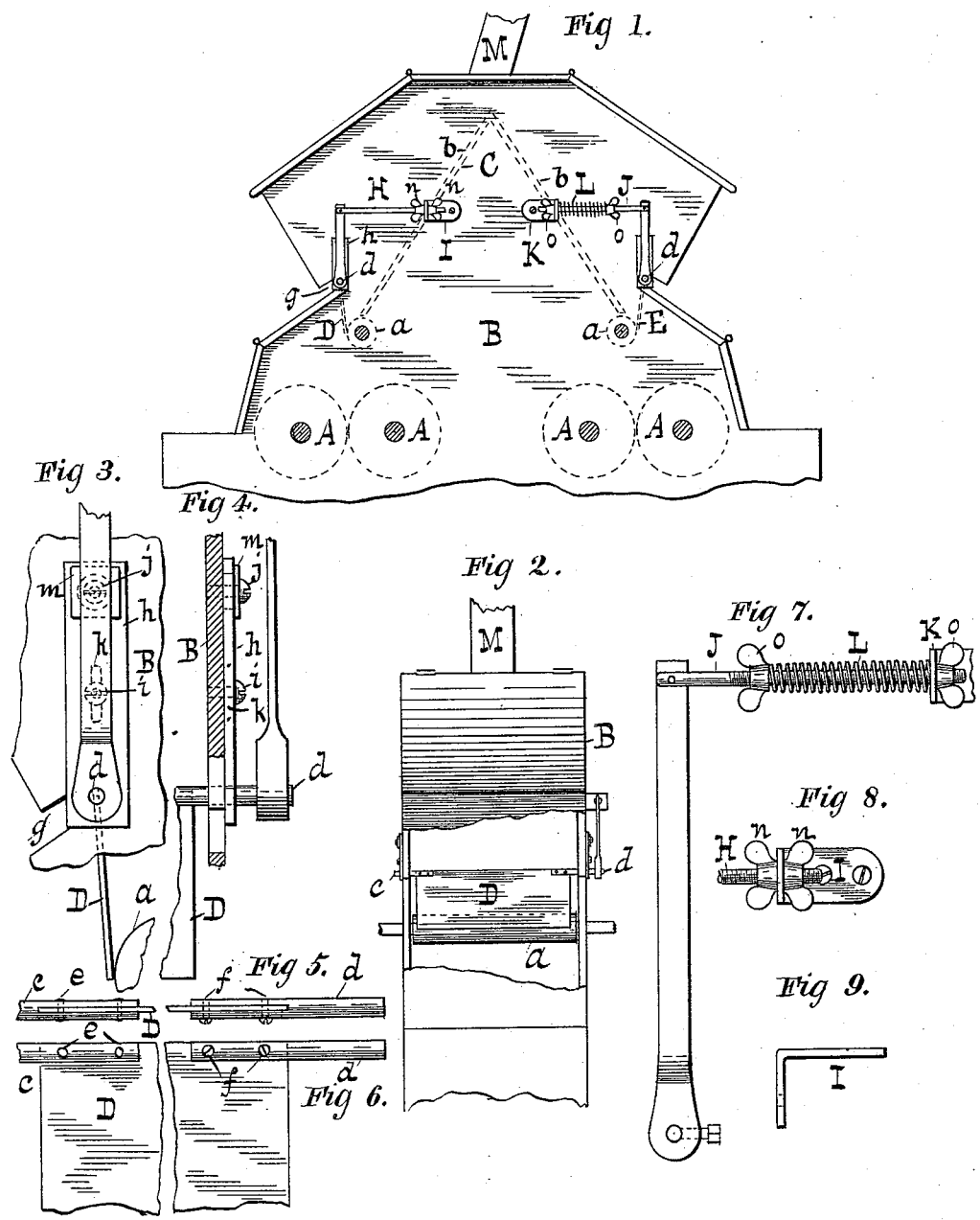
WITNESSES
Dan'l Fisher
George A. Hemsley
INVENTOR
August F. Dellone

UNITED STATES PATENT OFFICE.

AUGUST F. DELLONE, OF BALTIMORE, MARYLAND.

FEED-HOPPER.

SPECIFICATION forming part of Letters Patent No. 463,493, dated November 17, 1891.

Application filed August 8, 1891. Serial No. 402,067. (No model.)

*To all whom it may concern:*

Be it known that I, AUGUST F. DELLONE, of Baltimore, Maryland, have invented certain Improvements in Feed-Hoppers, of which the following is a specification.

In the description of the invention which follows reference is made to the accompanying drawings, forming a part hereof, and in which—

Figure 1 is an exterior side elevation of a feed-hopper provided with my improvements, and Fig. 2 a partly sectional end view of the same. Figs. 3, 4, 5, 6, 7, 8, and 9 are details of the invention on an enlarged scale.

Similar letters of reference indicate similar parts in all the figures.

A A are the crushing-rolls, and B is the feed-hopper. The feed-rolls within the hopper B are denoted by $a$.

C is a deflector formed of two boards $b$, united at the top and extending in reversed inclined positions to the top of the feed-rolls $a$.

D and E are pivoted doors within the hopper B, with their free ends adapted to be moved toward or from the sides of the feed-rolls $a$ to contract or expand the discharge-apertures from the hopper.

The parts thus far described are all commonly used in feed-hoppers, and form no part of this invention.

By reference particularly to Figs. 5 and 6 it will be seen that the pivots $c$ and $d$ of the doors D and E are formed of rods the inner ends of which are slotted so as to fit over the upper edges of the doors, and that the pivot $c$ is attached permanently to the door D by rivets $e$, while the one $d$ is secured by screws $f$ so as to be removable. Fig. 5 is a top view of the two pivots and the ends of the attached door, and Fig. 6 is a side view of Fig. 5. The rods $c$ and $d$ are not in the hopper, but situated in a notch $g$ provided for them. The said pivoted rods are sustained by plates $h$, through which they pass, and the plates are secured to the sides of the hopper by screws $i$ and $j$. The screws $i$ pass through slots $k$, extending longitudinally of the plates in order to admit of a vertical adjustment of the pivots, while the holes for the screws $j$ are round, but considerably larger than the screws and covered by washers $m$. By this arrangement, as seen particularly in Figs. 3 and 4, which represent, respectively, an exterior side and a sectional end view of a part of the hopper and certain of its attachments, the doors can be raised or lowered and thrown in or out, the screws $i$ being the pivotal points.

The pivotal rods $d$ of the doors D and E are each provided with a stem which unites it to a lug on the side of the hopper, but the said stems effect different results, as will hereinafter fully appear.

The stem connected to the door D is denoted by H and passes through the lug I, and it is provided with two thumb-nuts. (See Fig. 8.) By means of these nuts the position of the door D with reference to its feed-roll $a$ can be arranged and a discharge-opening of any required width effected and maintained.

The stem J of the door E has nuts $o$ corresponding in every particular with those $n$ before described; but the threaded portion of the stem is longer, and between the lug K and the inner nut $o$ is a coiled spring L, the tension of which is regulated by the said nut. (See Fig. 7.)

M is the spout for conveying the grain to be ground to the hopper.

The operation of the invention is as follows: The grain, being admitted to the hopper through the spout, passes to the left of the deflector C and a portion of it escapes through the opening between the door D and the adjacent feed-roll to the crushing-rolls beneath. As the discharge is not equal to the feed, the left-hand section of the hopper becomes filled and the surplus falls over the deflector to the section of the hopper to the right and escapes through the opening between the door E and its feed-roll to the other set of crushing-rolls. The width of the discharge-opening first described is regulated by the nut $n$, so that the opening is capable of carrying off about one-half of the grain furnished by the spout M, and the tension of the spring L is adjusted so that a similar opening is automatically disclosed by the door E, which admits of the discharge of the other half. By this arrangement a more regular feed can be effected than if both doors were automatically adjustable, for the reason, among others, that no two spring-held doors can be made to operate with exactly the same weight of grain.

When the proper adjustment desired is accomplished, any slight variation of weight or change in the condition of material fed to the hopper is automatically provided for, and a regular and accurate discharge through both openings to the crushing-rolls obtained.

I claim as my invention—

In a feed-hopper, two pairs of crushing-rolls with a feed-roll over each pair, a deflector between the said feed-rolls, a feed-spout, a fixed adjustable door in connection with one feed-roll, and a spring-held door in connection with the other feed-roll, all combined substantially as and for the purpose specified.

AUGUST F. DELLONE.

Witnesses:
DANL. FISHER,
W. T. HOWARD.